United States Patent Office 3,707,469
Patented Dec. 26, 1972

3,707,469
2,9-BIS-TRIFLUOROMETHYLQUINACRIDONE AND INTERMEDIATE THEREFOR
Edward E. Jaffe, Union, N.J., assignor to E. I. du Pont de Nemours and Company, Wilmington, Del.
No Drawing. Filed Sept. 22, 1970, Ser. No. 74,535
Int. Cl. C07d 37/18
U.S. Cl. 260—279 R  4 Claims

ABSTRACT OF THE DISCLOSURE

The novel quinacridone pigment, 2,9-bis-trifluoromethylquinacridone, is prepared, as for example, by oxidation of novel intermediate 2,9-bis-trifluoromethyl-6,13-dihydroquinacridone.

BACKGROUND OF THE INVENTION

Linear quinacridone of the composition

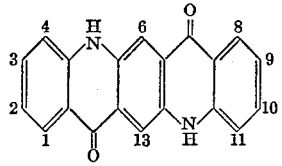

as well as various substituted quinacridones have found wide application in all types of coating compositions. However, for the pigmentation of thermoplastic acrylic lacquers and thermosetting acrylic and alkyd enamels in the bluish-red color range, the use of the quinacridone pigments has been severely restricted by the poor rheological properties exhibited by coating compositions comprising these pigments. The quinacridone of preference in commercial applications up to the present time has been 2,9-dimethylquinacridone. Although this substituted quinacridone possesses valuable properties, particularly as regards desirable hue and strength, it is recognized that both lacquers and enamels pigmented therewith show excessive viscosity and poor reflow characteristics. This undesirable property prevents the user from applying coatings comprising 2,9-dimethylquinacridone in the conventional way to give attractive finishes. The dried paint film made using this substituted quinacridone shows, in the case of lacquers, low gloss and an uneven scratched surface. Enamels prepared comprising this pigment show exceedingly low gloss unacceptable for many applications. These characteristics of the quinacridone of choice in prior art present serious problems for its use in automotive finishes.

SUMMARY OF THE INVENTION

In accordance with the invention, there is provided the novel compound 2,9-bis-trifluoromethylquinacridone, including the α and β forms thereof. This quinacridone is conveniently prepared by oxidation of the corresponding 2,9-bis-trifluoromethyl-6,13-dihydroquinacridone, as for example using sodium m-nitrobenzene sulfonate as the oxidizing agent. The substituted quinacridone pigment of the invention when used in coating compositions exhibits superior properties in rheology, gloss, and reflow characteristics. These outstanding properties are shown particularly in either lacquer or enamel automotive finishes wherein a thermoplastic acrylic lacquer resin vehicle or a thermosetting acrylic or alkyd resin vehicle is pigmented with the substituted quinacridone 2,9-bis-trifluoromethylquinacridone. Automotive finishes comprising this pigment at levels customarily used, possess good rheological properties and show excellent thermal reflow characteristics for the acrylic lacquer systems. As a consequence of this, unlike the lacquer or enamel of similar color obtainable with other quinacridones in the same color range, the compositions comprising 2,9-bis-trifluoromethylquinacridone may be readily applied by conventional techniques to give finishes of the high quality required for automotive use.

The following examples are given to illustrate the invention. Illustrated also will be the outstanding properties of thermosetting and thermoplastic resin coatings comprising the resultant pigments. These examples are given by way of illustration only, and are not to be considered as in limitation of the invention. Parts and percentages are by weight unless otherwise indicated.

Example 1.—Preparation of diethyl-2,5-bis-(p-trifluoromethylphenylamino)-3,6-dihydroterephthalate This example illustrates the preparation of the dianilinoterephthalic ester precursor of the 2,9-bis-trifluoromethylquinacridone of this invention.

Fifty-one and two-tenths parts (0.2 mole) of diethyl succinyl-succinate is placed in a suitable vessel equipped with an agitator, reflux condenser and means for maintaining an inert atmosphere in the vessel. After introducing an inert atmosphere of nitrogen which is then maintained throughout subsequent steps, 480 parts of denatured ethanol and 70 parts (0.435 mole) of p-trifluoromethylaniline are introduced followed by 1 ml. of concentrated HCl. The reaction mixture is then heated to the boil whereupon a clear solution is obtained. Reflux is continued for a five-hour period, during which time a solid gradually precipitates out of solution. After cooling, the solid is removed by filtration, washed with alcohol, and reslurried in 400 parts of ethanol to which 3.6 parts of sodium carbonate in 50 parts water is added, and the mixture stirred for about 10 minutes to neutralize the amine hydrochloride catalyst. The solid is again filtered from the slurry, washed with water until chloride and base free, and dried at 60° C. to give 94.0 parts of a light colored solid (86.8% yield). A small sample recrystallized from denatured alcohol showed a melting point of 209–211° C.

Found: N, 5.43%. Calculated for $C_{26}H_{24}F_6N_2O_4$: N, 5.16%.

Example 2.—Preparation of 2,9-bis-trifluoromethyl-6,13-dihydroquinacridone

This example illustrates the preparation of the dihydroquinacridone precursor of the 2,9-bis-trifluoromethylquinacridone of this invention.

Eleven-hundred parts of purified "Dowtherm A" (the eutectic mixture of 23.5% biphenyl and 76.5% diphenyl ether) is placed in a suitable vessel equipped with an agitator, a distillation set-up and means for maintaining an inert atmosphere. The solvent is blanketed with an inert nitrogen atmosphere which is maintained throughout the experiment. The "Dowtherm A" is heated to a vigorous reflux and, over a period of about one hour, 93 parts of the diethyl-2,5-bis-(p-trifluoromethylphenylamino)-3,6-dihydroterephthalate prepared according to Example 1 is uniformly added. The product ethanol is allowed to distil out of the reaction mixture. The insoluble product precipitates out of the boiling "Dowtherm A." After completion of the addition, reflux is continued for another two hours, the resulting suspension cooled to about 100° C. and the solid removed by filtration followed by washing with alcohol on the funnel. After drying, 71.5 parts (92.8% yield) of light tan 2,9-bis-trifluoromethyl-6,13-dihydroquinacridone is obtained.

Found: N, 5.79%. Calculated for $C_{22}H_{12}N_2F_6O_2$: N, 6.22%.

Example 3.—Preparation of 2,9-bis-trifluoromethyl-quinacridone

Seventy-one parts of the 2,9-bis-trifluoromethyl-6,13-dihydroquinacridone, prepared according to Example 2, together with 1920 parts of denatured ethanol are placed in a vessel equipped with an agitator and reflux condenser. A solution of 106 parts sodium hydroxide in 106 parts of water is added and the mixture stirred at room temperature over a period of 15 minutes, after which 71 parts of sodium m-nitrobenzene sulfonate is added. The agitated mixture is heated to the boil and kept under reflux for 1.5 hours. It is then diluted with a large excess of cold water and the precipitate is isolated by filtration followed by washing with water until alkali-free. The product is dried at 80° C. to give 69.0 parts (97.8% yield) of a bluish-red powder.

This crude product exhibits an X-ray diffraction pattern with two strong bands of diffraction angles ($2\theta$) of 18.7° and 26.3° and two bands of lesser intensity at 4.5° and 23.5°. This phase is designated the beta phase. It is a crude pigment in relatively large particle size but it is a stable phase and not generally changed by exposure to powerful solvents such as dimethylformamide.

Example 4.—Purification of pigment and preparation of α- and β-phase of 2,9-bis-trifluoromethylquinacridone One-hundred fifty-three parts of crude 2,9-bis-trifluoromethylquinacridone made in Example 3 is pulverized and dissolved in 2210 parts of 97% $H_2SO_4$ maintained at 8–10° C. When solution is complete as determined by microscopic examination, water is added slowly, while maintaining the temperature about 8–10° C., until the acid concentration is reduced to 90% at which time a solid crystalline precipitate comes out of solution. The precipitate is filtered and washed on the funnel with 85% sulfuric acid and then introduced into a large volume of ice and water to regenerate the pigment which is then filtered, washed free of acid with water, and dried to give 124.4 parts of a red pigment.

Upon examination by X-ray diffraction, the acid crystallized product is shown to be a different phase than that described in Example 3, with a diffuse X-ray diffraction pattern showing a weak band at 4.8° ($2\theta$), a stronger band at 13.4° and 19.1° ($2\theta$), and a fairly sharp band of strong intensity at 25.5° ($2\theta$). This phase is designated the alpha phase since it is converted to the beta phase upon exposure to strong solvents such as dimethylformamide.

Thus, on refluxing the alpha phase is about tenfold its weight of dimethylformamide, an excellent recovery of the highly crystalline beta phase is obtained. Its X-ray diffraction pattern shows two strong bands at 18.6° and 26.0° ($2\theta$), and bands of lesser intensity at 4.5°, 19.4°, 20.5°, and 23.5° ($2\theta$).

The analysis of this product shows:

Found (percent): N, 6.25; C, 59.21; H, 2.26. Calculated for $C_{22}H_{10}N_2F_6O_2$ (percent): N, 6.25; C, 58.90; H, 2.23.

Example 5.—Particle size reduction of β-phase 2,9-bis-trifluoromethylquinacridone and its incorporation into thermoplastic lacquer Eighteen grams of crude β-phase pigment as produced in Example 4 is milled by rotation on a roller at 120 r.p.m. for 72 hours in a quart can containing 1500 parts of ½" steel balls, 150 parts of roofing nails, 135 parts of hydrated aluminum sulfate ($Al_2(SO_4)_3 \cdot 15H_2O$) and 4.0 parts of tetrachloroethylene. The powder is then separated from the nails and balls by screening and is added to a solution of 75 parts of 96% $H_2SO_4$ in 2000 parts of water. The acidic slurry is heated with stirring to 95–100° C. and stirred at that temperature for one hour, following which the pigment is separated by filtration. The filter cake is washed acid- and sulfate-free with water and then dried and pulverized. As a comparative control, 2,9-dimethylquinacridone, the pigment of choice for this application up to the present time, is similarly particle-size reduced by milling, washing, drying and pulverizing.

In order to prepare a high quality dispersion of the pigments in thermoplastic lacquer, they are first predispersed on a two roll mill in the following manner:

One-hundred parts of pigment, 125 parts of cellulose acetate butyrate, 17.8 parts polymethyl methacrylate and 63.5 parts plasticizer (such as butyl benzylphthalate) are placed in a suitable container. About 225 parts of a solvent mixture consisting of 50% toluol, 30% methyl ethyl ketone and 20% "Cellosolve"[1] acetate is added. The mixture is agitated by hand with a spatula and transferred onto a two-roll mill. The roll dimensions are 6" diameter x 12" long, the clearance between the rolls is 12±2.0 mils, the roll speeds are (a) front 36 r.p.m., (b) back 24 r.p.m., and the roll temperature at start is (a) front 210° F., (b) back 40–50° F. Milling is continued for 25 minutes after the material no longer adheres to the back roll. To insure good mixing and shear, the material is cut off the rolls about every two minutes and finally removed from the rolls as 4–5 foot sheet. After cooling, the material is crushed and put through a five mesh screen.

For incorporation of the above dispersion into the vehicle 334.8 parts polymethylmethacrylate, and
71.6 parts cellulose acetate butyrate are placed in a suitable cylindrical container equipped with a 1200 r.p.m. agitator and a water-cooled condenser.

The agitator is activated and 68 parts of the screened material is added over a 30-minute period through the condenser opening. Agitation is continued for 1.5 hours while unmixed particles are occasionally scraped down into the agitating mixture. To the agitating mixture is then added 50 parts of the toluol/ketone/"Cellosolve" solvent mixture over a 30-minute period, followed immediately by the addition, over the same time period, of a mixture consisting of 49.3 parts plasticizer (such as butyl benzyl phthalate)
56.0 parts "Cellosolve" acetate
137.7 parts of the toluol/ketone/"Cellosolve" solvent mixture.

Agitation is continued for 15 minutes and the lacquer transferred to a closed container. The coating composition has a pigment-to-binder ratio of 0.10 and contains 3.1% pigment by weight. For the determination of viscosities, the lacquer is diluted with the toluol/ketone/"Cellosolve" solvent mixture to a 2% pigment content. Viscosity tests are made on the resulting lacquers using the LV Model of Brookfield Engineering Laboratories, Sharon, Mass., U.S.A., which indicates consistency in terms of the drag produced upon a spindle rotated in the material being tested. The readings are a direct read-out and show an increase with increase in viscosity. The time for the lacquers to flow from a No. 4 Ford Cup Viscometer is also determined.

| Sample | Viscosity at— | | | | Flow time (sec.) |
| --- | --- | --- | --- | --- | --- |
| | 6 r.p.m. | 12 r.p.m. | 30 r.p.m. | 60 r.p.m. | |
| 2,9-dimethyl QA | 26.5 | 31 | 38 | 47.2 | 113 |
| 2,9-bis-trifluoromethyl QA | 1.0 | 1.6 | 3.5 | 6.7 | 31 |

A metallized finish prepared by adding aluminum flake dispersion to the 2,9-bis-trifluoromethylquinacridone pigmented lacquer in conventional fashion to give a ratio of aluminum/color ratio of 10/90, produces a bluish-red metallic-colored film with excellent "two-tone" effect and superior gloss. The "two-tone" effect is recognized by those skilled in the art as change in color with change in angle of viewing so as to produce desirable "high-

---

[1] ("Cellosolve" product of Union Carbide. It is the acetate of ethoxyethanol.)

lights" on curved portions of a surface. The lacquer pigmented with 2,9 - bis - trifluoromethylquinacridone possesses excellent rheological properties as well as thermal reflow, making it particularly useful as an automotive finish.

Thermal reflow is determined as follows:

The lacquers are diluted to a spraying viscosity of 12–15 sec. in a No. 4 Ford Cup and panels are sprayed to a dry film thickness of 2.5±0.2 mils. The solvent is flashed off in 15 minutes and the finish baked for 10 minutes at 225° F. Using a specific set-up and 600 grit sand paper, a major part of each panel is equally scratched for a given period of time and then rinsed with water and dried. The dry panels are rebaked for 30 minutes at 310° F. The panels are rated according to gloss, distinctness of image, and number of lines left on the surface of the reflowed portions.

By these criteria, the 2,9-bis-trifluoromethylquinacridone lacquer is rated excellent while the 2,9-dimethylquinacridone counterpart is rated poor.

Example 6.—Incorporation of pigmentary β-phase into a thermosetting enamel

Crude 2,9-bis-trifluoromethylquinacridone is particle-size reduced by the method described in Example 5. As a comparative control, 2,9-dimethylquinacridone is similarly processed.

Twelve parts of each pigment is dispersed in an acrylic resin by grinding it in a one-pint glass jar containing 30 parts of a thermosetting acrylic resin solution (containing 50% hydroxyl-substituted methyl methacrylate), 58 parts of a solvent composed of 75% xylene and 25% "Solvesso" (a petroleum hydrocarbon solvent sold by Enjay Chemical Co.), and 400 parts of ⅛" steel shot. After 48 hours of grinding by rotating the sealed jar at approximately 70% of critical speed, 48.0 additional parts of the thermosetting acrylic resin solution and 18.0 additional parts of the xylene/"Solvesso" mixed solvent are added, and the sealed jar rolled for an additional 20–30 minutes. At this time, 34.0 additional parts of the resin solution and 40.0 parts of melamineformaldehyde solution (containing 60% non-volatiles) are added as a cross-linking agent, and the material is thoroughly mixed. The coating composition obtained, after straining to remove the steel shot, has a pigment-to-binder ratio of 0.15, and contains 5% pigment and 33.3% binder by weight based on final paint. The ratio of resin to cross-linking agent is 70/30.

Viscosities of the resulting enamels are determined on the Brookfield Viscometer (No. 3 spindle at 88° F.) as described in Example 5.

| Sample | Viscosity at— | | | |
|---|---|---|---|---|
| | 6 r.p.m. | 12 r.p.m. | 30 r.p.m. | 60 r.p.m. |
| 2,9-dimethyl QA | 57 | 64 | 75 | 86 |
| 2,9-bis trifluoromethyl QA | 0.5 | 0.7 | 1.5 | 3.0 |

A metallized finish, prepared by adding aluminum flake dispersion to the 2,9-bis-trifluoromethylquinacridone pigmented enamel in conventional fashion to give a ratio of aluminum/color of 25/75 produces a bluish-red metallic colored film with excellent "two-tone" effect. Because of the excellent rheological properties of the enamel pigmented with 2,9-bis-trifluoromethylquinacridone, it is particularly useful as a pigment in a thermosetting automotive finish.

The effect of rheological properties is not dependent on the method of synthesis of the 2,9-bis-trifluoromethylquinacridone nor on the method of particle size reduction. The crude pigment can be synthesized as shown in the above Example 3, or the intermediate diethyl-2,5-bis-(p-trifluoromethylphenylamino) - 3,6 - dihydroterephthalate can be converted to the 2,5-bis-(p-trifluoromethylphenylamino)terephthalic acid followed by cyclization in polyphosphoric or other acid dehydrating agent, according to known prior art methods. Particle-size reduction can be accomplished by any of the conventional procedures such as salt milling, salt-solvent milling, solvent milling, milling with borax, acid pasting, and similar procedures.

Although in the examples which are given for the operation of this invention the preparation of the desired products is shown as comprising three separate steps, it is possible, and indeed is preferable, to combine the first two steps of the operation. Thus, the condensation of succinyl succinic esters with the amine and the cyclization to the substituted dihydroquinacridone can be carried out in the same solvent by adding the amine to succinyl succinic ester in "Dowtherm A" and heating the agitated mixture to 80–100° C. under a vacuum of 10–25 millimeters of mercury. Condensation proceeds with removal of product water. When the condensation is complete, excess amine is removed under vacuum by distillation, while cold distilled "Dowtherm A" is replenished with new solvent. The amine is removed sufficiently when the distillate contains 0.05% or less of the amine. The substituted dialkyl terephthalic ester solutions in "Dowtherm A" are then slowly introduced into boiling agitated "Dowtherm A" under nitrogen while allowing product alcohol to distil out. Comparable or better yields are obtained by carrying out the first two steps in the same solvent.

In the examples which are given to illustrate the operation of this invention, the reaction medium used is "Dowtherm A," but other inert organic media are equally useful. These inert liquids include biphenyl, diphenyl ether, tetramethylene sulfone, dialkyl phthalate, and others.

What is claimed is:
1. 2,9-bis-trifluoromethyl-6,13-dihydroquinacridone.
2. 2,9-bis-trifluoromethylquinacridone.
3. The quinacridone of claim 2 in the α form.
4. The quinacridone of claim 2 in the β form.

References Cited

UNITED STATES PATENTS

| 3,272,821 | 9/1966 | Schweizer | 260—279 |
| 3,261,837 | 7/1966 | Bohler | 260—279 |

FOREIGN PATENTS

| 22,418 | 9/1969 | Japan | 260—279 |
| 413,181 | 12/1966 | Switzerland | 260—279 |
| 868,360 | 5/1971 | Great Britain | 260—279 |
| 22,417 | 9/1969 | Japan | 260—279 |

OTHER REFERENCES

Chem. Abst., vol. 71, Col. 92622W.

DONALD G. DAUS, Primary Examiner

U.S. Cl. X.R.

106—288 Q; 260—471 A, 687, 17 R